(12) United States Patent
Soloveichik et al.

(10) Patent No.: US 7,906,092 B2
(45) Date of Patent: Mar. 15, 2011

(54) METHODS FOR PREPARING COMPOSITIONS WHICH COMPRISE MAGNESIUM BOROHYDRIDE, AND RELATED MATERIALS

(75) Inventors: Grigorii Lev Soloveichik, Latham, NY (US); Ji-Cheng Zhao, Latham, NY (US)

(73) Assignee: General Electric Company, Niskayuna, NY (US)

( * ) Notice: Subject to any disclaimer, the term of this patent is extended or adjusted under 35 U.S.C. 154(b) by 788 days.

(21) Appl. No.: 11/767,067

(22) Filed: Jun. 22, 2007

(65) Prior Publication Data
US 2008/0014136 A1    Jan. 17, 2008

Related U.S. Application Data

(63) Continuation-in-part of application No. 11/425,603, filed on Jun. 21, 2006, now abandoned.

(51) Int. Cl.
*C01B 6/13*    (2006.01)
(52) U.S. Cl. .................................. 423/286; 423/287
(58) Field of Classification Search .................. 423/286, 423/287
See application file for complete search history.

(56) References Cited

U.S. PATENT DOCUMENTS

| | | | |
|---|---|---|---|
| 2,852,335 A | 9/1958 | Nigon | |
| 2,930,674 A | 3/1960 | Heying | |
| 2,930,675 A | 3/1960 | Batha | |
| 3,111,372 A | 11/1963 | Koster et al. | |
| 3,113,832 A * | 12/1963 | Kollonitsch et al. | 423/287 |
| 3,758,677 A * | 9/1973 | Kraus et al. | 423/645 |
| 5,688,303 A * | 11/1997 | Benjamin | 75/352 |
| 2004/0065395 A1 | 4/2004 | Desgardin et al. | |
| 2004/0065865 A1 | 4/2004 | Desgardin et al. | |
| 2004/0249215 A1 | 12/2004 | Suda et al. | |
| 2005/0207959 A1 | 9/2005 | Zhou | |
| 2006/0194695 A1* | 8/2006 | Au | 502/400 |

FOREIGN PATENT DOCUMENTS

| | | |
|---|---|---|
| EP | 1424310 | 6/2004 |
| GB | 864617 | 3/1957 |
| GB | 840572 | 7/1960 |
| JP | 2004-10446 | 1/2004 |
| JP | 2004010446 | 1/2004 |
| JP | 2002173306 | 7/2007 |

OTHER PUBLICATIONS

JP2002173306 Publication Date Jun. 21, 2002. "Method of Manufacturing Metal Hydrogen Complex Compound," (Abstract Only).

(Continued)

*Primary Examiner* — Jessica L Ward
*Assistant Examiner* — Paul A Wartalowicz
(74) *Attorney, Agent, or Firm* — Francis T. Coppa

(57) ABSTRACT

Disclosed herein is a method for preparing magnesium borohydride. The method includes the step of reacting a metal borohydride with a metal salt composition in a solvent, to form a reaction mixture. The metal salt composition comprises at least one magnesium salt. The metal borohydride and the metal salt composition are insoluble in the solvent. The method further includes the step of grinding the reaction mixture to produce a composition that includes magnesium borohydride; and removing the solvent from the composition. Another embodiment of this invention relates to a new material. The material is an orthorhombic crystal phase of magnesium borohydride.

17 Claims, 4 Drawing Sheets

OTHER PUBLICATIONS

L.V. Titov et al., "Synthesis and Thermal Decomposition of Magnesium, Calcium and St ontium Octahydrotriborates Solvated with Diglyme," Russian Journal of Inorganic Chemistry, 29 (3), 1984. Received Sep. 27, 1982, pp. 386-389.

V. N. Konoplev, "Synthesis of Magnesium Tetrahydridoborate," Russian Journal of Inorganic Chemistry, 25 (7), 1980. Received Apr. 28, 1978, pp. 964-966.

D.S. Stasinevich et al., "Thermochemistry and Thermodynamics of the High-temperature Formation of Alkali-metal Tetrahydroborates," Russian Journal of Physical Chemistry, 50 (12), 1976. Received Oct. 31, 1974.

Richard Bauer, "Magnesium-alkyl-boro-hydrogen and its reactive behavior II1," Research Institute of Eltro GmbH & Contract/Order, Heidelberg [Mitt. Z. Naturforschg. 16b, (1961), submitted on Jul. 28, 1961], 4 pages.

Mathias Bremer et al., Metal Tetrahydroborates and Tetrahydroborato Metalates. 30 [1] Solvates of Alcoholato-, Phenolato-, and Bis(trimethylsilyl)amido-Magnesium Tetrahydroborates XMgBH4(Ln), Z. Anorag. Alleg. Che. 2005, 631, pp. 683-697.

Liang Shi et al., "Synthesis of ultrafine superconducting MgB2 by a convenient solid-state reaction route," Elsevier, Physica C 405 (2004), Received Dec. 22, 2003, pp. 271-274.

Mathias Bremer et al., "The Structure of Some Amine Solvates of Magnesium Bis(tetrahydroborate) and DFT Calculations and Solvates of Lithium Tetrahydroborate," European Journal of Inorganic Chemistry 2003, Received May 28, 2002, pp. 111-119.

Heinrich Noth et al, "Structure and Reactions of Tetrahydroborates: New Results with a Fascinating Ligand," Current Topics in the Chemistry of Boron (1994), 6 pages.

Rosanna Bonaccorsi et al, "Nonempirical Study of the Structure and Stability of Beryllium, Magnesium, and Calcium Borohydrides," Inorganic Chemistry, vol. 30, No. 15, 1991, Received Feb. 7, 1990, pp. 2964-2969.

Heinrich Noth et al., "Metal Tetrahydridoborates and Tetrahydridoborates Metal plates 11 [1] for Crystal and Molecule structure of Magnesium Tetrahydridoborage Mg (BH4) 2.3 THF," Z. Nature research.37b, 14991503 (1982), Received on Aug. 17, 1982, 6 pages.

K.N. Semenenko et al., "On the Interaction of Magnesium Chloride with Alkaline Metals Aluminum Hydride and Lithium Boron Hydride," Bulletin of the Moscow University, No. 2—1974, Received Mar. 23, 1973, pp. 185-187.

V.N. Konoplev et al., "Equilibrium Diagram of the Magnesium Tetrahydroborate-Diethyl Ether System," Russian Journal of Inorganic Chemistry, 17 (8), Apr. 1972, pp. 1211-1212.

J. Plesek et al., "Chemistry of Boranes. IV. On Preparation, Properties, and Behavior Towards Lewis Bases of Magnesium Borohydride," Collection Czechoslovak Chem. Commun., vol. 31, Received May 25, 1965, pp. 3845-3858.

S. Hermanek et al., "Chemistry of Boron Hydrides I. Preparation of Magnesiumoctahydrotriborates," Collection of Czech. Chem. Commun., vol. 31, Received Aug. 13, 1963, 16 pages.

Richard Bauer, "For knowledge of Magnesium Boranate production," Research Institute of Eltro GmbH & Co., Heidelberg [Z. Naturforschg. 17b, [1962], submitted on Mar. 1, 1962], pp. 277-278.

Janos Kollonitsch et al. "New and Known Complex Borohydrides and some of their Applications in Organic Syntheses," Nature (London, United Kingdom), vol. 173, Jan. 16, 1954, pp. 125-126.

V.N. Konoplev et al., "Solubility Isotherm of Magnesium Tetrahydroborate and Sodium Tetrahydroborate in NN-Dimethylformamide at 0°," Russian Journal of Inorganic Chemistry, Oct. 1965, Received Sep. 17, 1964, pp. 1283-1284.

V.I Mikheeva et al., "The Reaction of Sodium Tetrahydroborate with Anhydrous Magnesium Chloride in NN-Dimethylformamide," Russian Journal of Inorganic Chemistry, Received Sep. 17, 1964, pp. 1148-1151.

E.C. Ashby et al., "Concerning the Existence of Hydridomagnesium Aluminohydride (HMgA1H4) and Hydridomagnesium Borohydride (HMgBH4)," Inorganic Chemistry, vol. 11, No. 5, 1972, Received Jul. 6, 1971, pp. 925-929.

B.M. Bulychev et al., "Complex Compounds of Aluminum Hydride Ethoxide with Mixed Aluminum and Boron Hydrides of Lithium and Magnesium: Compositions, Physiocochemical Properties, and Synthesis of Unsolved Aluminum Hydride," Physicochemical Analysis of Inorganic Systems: Russian Journal of Inorganic Chemistry, vol. 43, No. 5, 1998; Received Jun. 11, 1997, pp. 752-758.

G. Soloveichik et al., "Method for Manufacturing Magnesium Borohydride," U.S. Appl. No. 11/305,914, filed Dec. 19, 2005.

K. Chlopek et al., "Synthesis and Properties of Magnesium Tetrahydroborate, Mg (BH4)2," Journal of Materials Chemistry, 2007, Received Feb. 21, 2007, 15 pages.

English Abstract of JP 2004010446.

* cited by examiner

US 7,906,092 B2

METHODS FOR PREPARING COMPOSITIONS WHICH COMPRISE MAGNESIUM BOROHYDRIDE, AND RELATED MATERIALS

BACKGROUND

This disclosure is related to compositions comprising magnesium borohydride, and methods for preparing such compositions.

Hydrogen is a "clean fuel" because it can be reacted with oxygen in hydrogen-consuming devices, such as a fuel cell or a combustion engine, to produce energy and water. Virtually no other reaction byproducts are produced in the exhaust. As a result, the use of hydrogen as a fuel effectively solves many environmental problems associated with the use of petroleum based fuels. Safe and efficient storage of hydrogen is, however, essential for many applications that can use the hydrogen fuel. In particular, minimizing volume and weight of the hydrogen storage systems are important factors in mobile applications.

Several methods of storing hydrogen are currently used, but these are either inadequate or impractical for widespread mobile consumer applications. For example, hydrogen can be stored in liquid form at very low temperatures. However, the energy consumed in liquefying hydrogen gas is about 30% of the energy available from the resulting hydrogen. In addition, a standard tank filled with liquid hydrogen will become empty in about a week through evaporation. Thus, dormancy is also a problem. These factors make liquid hydrogen impractical for most consumer applications.

An alternative is to store hydrogen under high pressure in cylinders. However, a 100 pound steel cylinder can only store about one pound of hydrogen at about 2200 psi, which translates into 1% by weight of hydrogen storage. More expensive composite cylinders can store hydrogen at higher pressures of about 4,500 psi, using special compressors to achieve a more favorable storage ratio of about 4% by weight. Although even higher pressures are possible, safety factors and the high amount of energy consumed in achieving such high pressures have compelled a search for alternative hydrogen storage technologies that are both safe and efficient. In view of the above, there is a need for safer, more effective methods of storing and recovering hydrogen.

Magnesium borohydride, $Mg(BH_4)_2$, is a promising material for hydrogen storage and recovery. It comprises up to about 14.8 weight percent (wt %) of hydrogen that can be liberated upon heating. The use of magnesium borohydride is limited by the absence of convenient methods for its manufacture. It is therefore desirable to have a convenient method for manufacturing magnesium borohydride.

SUMMARY OF THE INVENTION

Disclosed herein is a method for preparing magnesium borohydride. The method comprises the step of reacting a metal borohydride with a metal salt composition in a solvent to form a reaction mixture. The metal salt composition comprises at least one magnesium salt, such as magnesium chloride. The metal borohydride and the metal salt composition are insoluble in the solvent. The method further comprises the step of grinding the reaction mixture to produce a composition that comprises magnesium borohydride; and removing the solvent from the composition.

Another embodiment of this invention relates to a new material. The material is an orthorhombic crystal phase of magnesium borohydride. The crystal phase is characterized by the following cell parameters: a=37.072(1) Å, b=18.6476(6) Å, c=10.9123(3) Å (Z=64), with a cell volume (V)=7543.71 Å$^3$.

DETAILED DESCRIPTION

Figure 1:
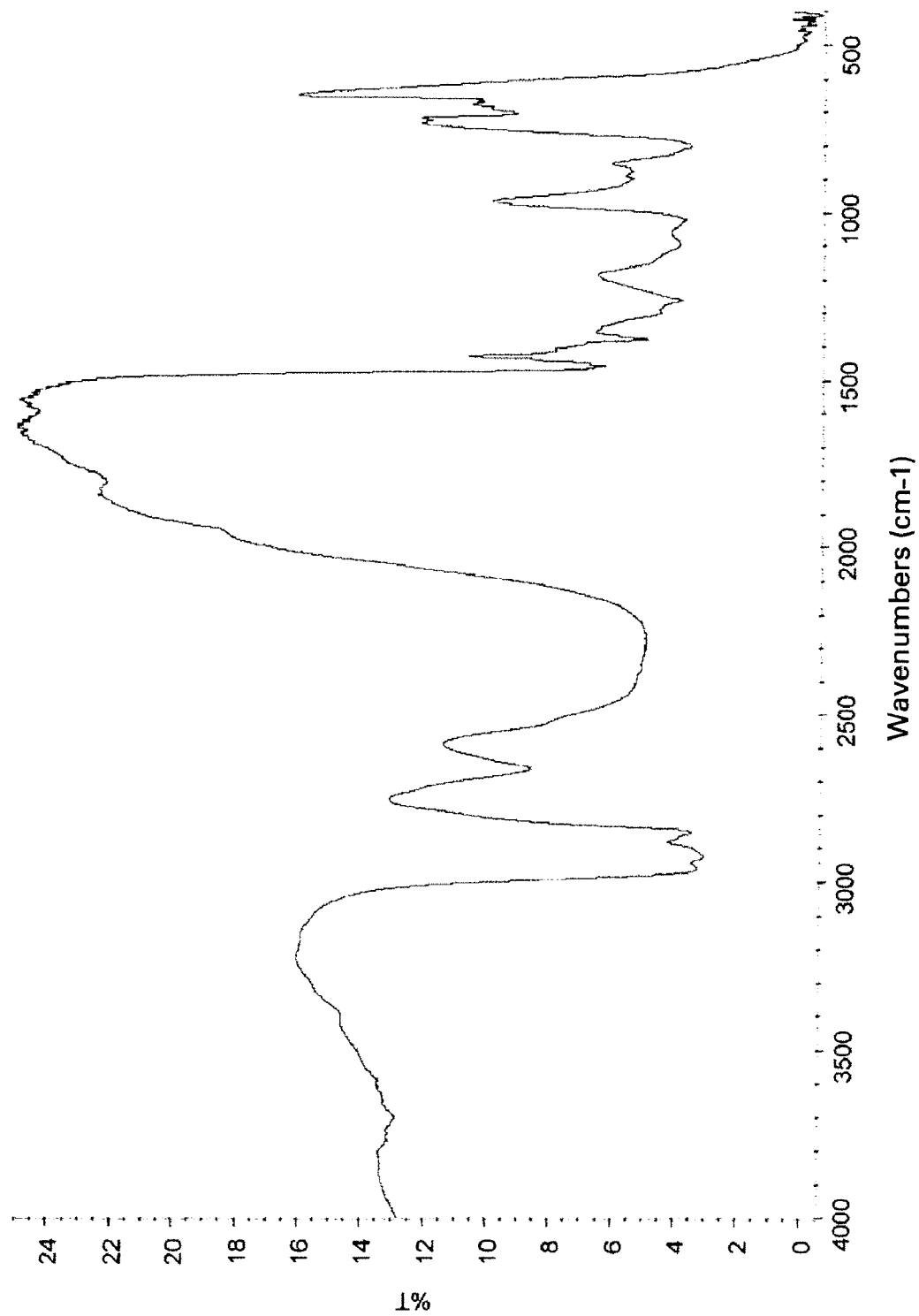
FIG. 1 is an infra-red (IR) spectrum, showing the presence of the boron-hydrogen bonds for magnesium borohydride.

It is to be noted that the terms "first," "second," and the like, as used herein, do not denote any order, quantity, or importance, but rather are used to distinguish one element from another. The terms "a" and "an" do not denote a limitation of quantity, but rather denote the presence of at least one of the referenced items. The modifier "about" used in connection with a quantity is inclusive of the stated value and has the meaning dictated by the context. It is to be noted that all ranges disclosed within this specification are inclusive and are independently combinable.

It has been inadvertently discovered that a composition comprising magnesium borohydride can be manufactured by reacting a metal borohydride with a metal salt composition, while grinding the reaction mixture in the presence of a solvent during the course of the reaction. In an exemplary embodiment, the grinding is accomplished in a ball mill. Disclosed herein, therefore, is a method for manufacturing the composition that comprises reacting a metal borohydride and a metal salt composition in a solvent. The reactants are practically insoluble in the solvent, but the target product is soluble. The solubility and reactivity of the reactants during the reaction is enhanced by grinding during the reaction. The reactions are conducted in such a solvent, to produce thermally unstable solvated borohydride complexes that decompose upon heating, to yield an unsolvated composition.

As noted above, the composition is produced by the reaction between a metal borohydride and a metal salt composition when the reactants are ground during the reaction. Insolubility of the starting reactants and some of the reaction products hinder the rate of reaction and hence the reaction yields. It is therefore desirable to increase the rate of reaction by facilitating the dissolution of the reactants during the reaction. Grinding has been discovered to be one effective method for refreshing the surface of reactants. During grinding, insoluble reaction products are displaced from the surface of the reactants. Upon displacement of the insoluble reaction products, reactive surfaces are exposed to each other, thereby promoting an increased rate of dissolution. The amount and type of grinding can be varied to facilitate the dissolution of insoluble solids during the reaction.

Examples of suitable metal borohydrides are those wherein the metal cation is an alkali metal, an alkaline earth metal, a transition metal, or the like, or a combination comprising at least one of the foregoing metals. Exemplary metal borohydrides are sodium borohydride, potassium borohydride, calcium borohydride, strontium borohydride, or the like, or a combination comprising at least one of the foregoing borohydrides.

As noted above, this method includes the use of a metal salt composition comprising at least one magnesium salt. A variety of magnesium salts may be employed. In preferred embodiments, the salts should be those which are substantially insoluble in the reaction solvent which is being used. The salts should also preferably not be significantly reduced by the borohydride anion present in the reaction. In this manner, the undesirable loss of the borohydride product can be minimized.

Non-limiting examples of the salts are the chlorides, sulfates, phosphates, and triflates of magnesium. Double salts can also be employed, e.g., lithium-magnesium chloride. In preferred embodiments, the metal salt composition comprises a metal chloride such as magnesium chloride.

The molar ratio of the borohydride group ($BH_4$) (in the metal borohydrides) to the magnesium salt (total magnesium salt) is about 2:1 to about 6:1 respectively. An exemplary molar ratio of the borohydride group ($BH_4$) to the magnesium salt is about 2:1 to about 3:1 respectively. When a magnesium chloride complex is employed, then an exemplary molar ratio of borohydride to total magnesium is about 2:1 to about 3:1.

As alluded to above, it is desirable for the solvent in which the reaction is conducted to not dissolve the reactants (the metal borohydride and metal salt composition). In an exemplary embodiment, the solvent also does not dissolve the metal salt formed as a result of the reaction between the metal borohydride and the magnesium salt. It is also desirable for the solvent to not dissolve any of the other reaction products, with the exception of the magnesium borohydride produced during the reaction. It is also desirable for the solvent to be extractable from the solvated magnesium borohydride, without promoting the decomposition of the unsolvated magnesium borohydride compound.

One illustrative solvent which is suitable for conducting the reaction is an alkyl ether. Examples of suitable alkyl ethers are methyl ether, ethyl ether, propyl ether, or the like, or a combination comprising at least one of the foregoing alkyl ethers. Another exemplary solvent is an alkyl amine.

The molar ratio of the solvent to the reactants is about 2:1 to about 500:1. An exemplary molar ratio of the solvent to the reactants is about 50:1 to about 100:1.

The reactants, together with the solvent, are subjected to grinding during the reaction. In other words, the reactants are ground in a wet state during the reaction. The reaction is generally conducted at a temperature of up to about 100° C. An exemplary reaction temperature is about 20° C. to about 35° C.

Non-limiting examples of grinding techniques include ball milling, milling in a Wiley mill, hammer milling, rod milling, semi-autogenous (SAG) milling, autogenous milling, pebble milling, milling using high pressure grinding rolls, milling in a Buhrstone mill, or the like, or a combination comprising at least one of the foregoing grinding operations. Ball milling, using inert balls, is a preferred technique in some embodiments. Exemplary ball mills are rolling or planetary ball mills.

The ball mill, a type of grinder, is a device used to grind materials like ores, chemicals, ceramics and paints. The ball mill may rotate around a horizontal axis, a vertical axis, or an axis inclined between the horizontal and the vertical, partially filled with the material to be ground in addition to the grinding medium. An internal cascading effect reduces the reactants to a fine powder during the process. The grinding medium is preferably ceramic balls, or stainless steel balls coated with a ceramic. An exemplary ceramic is tungsten carbide. (It should be emphasized that other types of grinding media are also possible). Industrial ball mills that can operate continuously, with reactants fed at one end and products discharged at the other end, can also be used. The amount and size of balls, as well as size of the vessel, are selected to provide effective grinding of insoluble solids during the reaction. Rolling or planetary ball mills can be used for this purpose. The grinding produces shear forces, reduces particle size (to some extent), and creates friction and/or intimate contact between the surfaces of reactant particles. The surfaces of the reactants are refreshed, thus accelerating the reaction.

The total time for grinding depends upon the ratio of the volume of grinding media (balls) to the volume of solid reactants that are being reacted, and the speed of the ball mill rotation. In general, for a reaction volume of about 100 to about 350 milliliters, it is desirable for the grinding to be conducted for a period of about 24 hours to about 72 hours. An exemplary reaction time is about 40-55 hours, when the reaction volume is about 100 milliliters. The reaction volume is the total volume of the metal borohydride, the magnesium salt (or multiple salts), along with the solvent.

After the reaction is completed, the insoluble, unreacted metal borohydride and any metal salt complexes produced during the reaction may be removed from the reaction mixture by a separation process such as membrane separation, filtration, decantation, precipitation, centrifugation, or the like, or a combination comprising at least two of the foregoing separation processes. Solvent may then be removed from solution containing the composition by evaporation, optionally in vacuum, to form a solid or liquid solvate of the borohydride complex. If the solvate has a limited solubility in the solvent, then the remaining insoluble part of the solvate is isolated from the precipitate by solvent extraction. After the isolation of the solvate, the unsolvated compound comprising magnesium borohydride can be recovered by heating the solvate to a temperature of about 180° C. to about 250° C., in a vacuum of about 0.01 to about 10 Torr.

In one exemplary embodiment for manufacturing the composition, sodium borohydride ($NaBH_4$) is reacted with magnesium chloride ($MgCl_2$) in a ball mill. Tungsten carbide balls can be used in the ball mill. The sodium borohydride ($NaBH_4$) is reacted with magnesium chloride ($MgCl_2$) in a molar ratio of 2:1, in the presence of diethyl ether, to produce solvated magnesium borohydride at ambient temperature and pressure, as shown in equation (I).

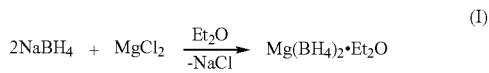

$$2NaBH_4 + MgCl_2 \xrightarrow[-NaCl]{Et_2O} Mg(BH_4)_2 \cdot Et_2O \qquad (I)$$

where $Et_2O$ represents the ethyl ether solvent. The resulting solvated magnesium borohydride is isolated and then heated to a temperature of about 180° C. to about 235° C., to yield the unsolvated composition comprising magnesium borohydride. (The composition may also contain magnesium hydride). An exemplary temperature for the desolvation is about 235° C. The yield of magnesium borohydride is from about 40% to about 80%, based on the amount of magnesium borohydride that could be theoretically obtained.

Thus, in summary, conducting the reaction under grinding conditions (e.g., wet grinding) increases the yields significantly, as compared to similar reactions that are conducted either in the absence of grinding, or in the absence of solvent (dry grinding conditions). In one embodiment, the reaction yields for reactions conducted under wet grinding conditions are increased by about 10% over reactions that are conducted under dry grinding conditions. In another embodiment, the reaction yields for reactions conducted under wet grinding condition are increased by about 25% over reactions that are conducted under dry grinding conditions. In yet another embodiment, the reaction yields for reactions conducted under wet grinding conditions are increased by about 35% over reactions that are conducted under dry grinding conditions.

When the reaction is conducted under wet grinding conditions, the reaction yields are generally greater than or equal to about 70%. In one embodiment, the reaction yields are greater than or equal to about 75%. In another embodiment, the reaction yields are greater than or equal to about 80%. In yet another embodiment, the reaction yields are greater than or equal to about 85%.

In one embodiment, the magnesium borohydride compound can be heated to a temperature of at least about 395° C. to produce hydrogen. In some preferred embodiments, the heating temperature is at least about 450° C. Hydrogen is generally produced in amounts of about 12.4 to about 14.8 wt %, based on the weight of the composition.

The following examples are meant to be exemplary, and not limiting.

EXAMPLES

Example 1

Figure 2:
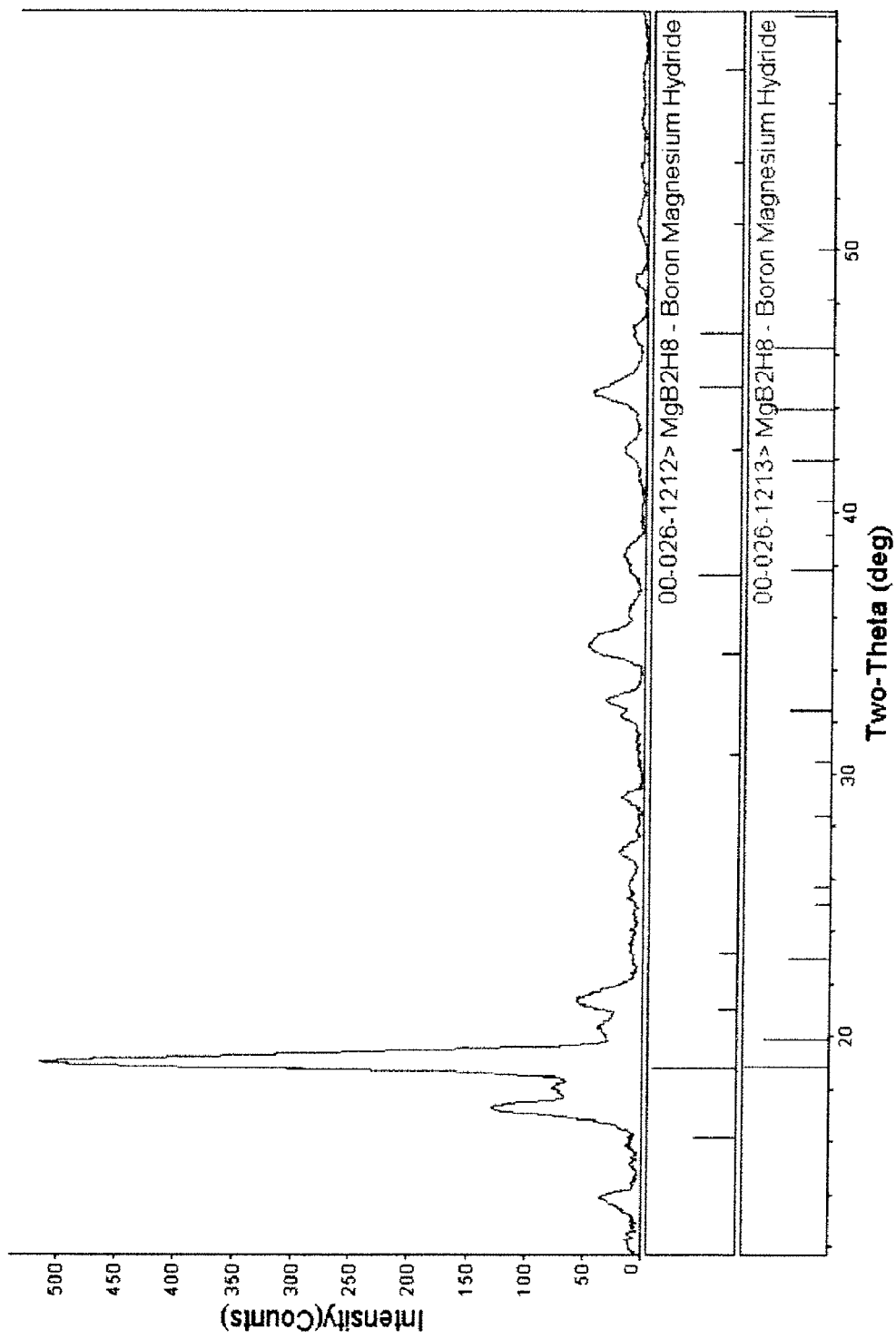
FIG. 2 is an X-ray diffraction (XRD) pattern characteristic of magnesium borohydride.

This experiment was performed to demonstrate the reaction between sodium borohydride and magnesium chloride in a ball mill to produce a composition comprising magnesium borohydride. A stainless steel cylindrical container with an inner diameter of 2.5 inches (6.4 cm) was charged with 3.0 grams (g) (31.5 mmol) magnesium chloride ($MgCl_2$), 3.6 g (5 mmol) sodium borohydride ($NaBH_4$), 120 mL ethyl ether ($Et_2O$), and 20 balls, each having a diameter of 0.5 inch (1.3 cm). The container was sealed with a copper seal, and placed on a roller. The rolls had a diameter of 2.5 inches (6.4 cm). The reaction mixture was ball-milled for 72 hours, with a rotation speed of about 60 rpm. The reaction mixture was filtered in vacuum through a medium glass frit. Evaporation of ether from the filtrate in vacuum, and heating of the resulting solid to 235° C., produced a white solid. The yield was 1.21 grams (71%). An infra-red (IR) spectrum of this solid in nujol (mineral/paraffin oil) is shown in FIG. 1, and indicates the presence of magnesium borohydride. FIG. 2 is an X-ray diffraction (XRD) pattern of the reaction product that is characteristic for the $Mg(BH_4)_2$ phase.

Example 2

These reactions were performed to demonstrate differences in yield when the reaction between sodium borohydride and magnesium chloride is conducted under different conditions. Ethyl ether was used as a solvent in all runs except Run 3, where the solvent was used only for extraction after ball-milling. The reactions were conducted under the conditions shown in the Table 1. Runs 1, 2 and 3 represent comparative runs where forms of agitation comprising magnetic stirring, dispersion, and dry ball milling, were respectively used. During Run 2, dispersion was conducted at 18,000 rpm, using an ULTRA TURRAX® disperser. During Run 2, fresh portions of $Et_2O$ were added to compensate for the solvent loss due to evaporation. Run 3 represents a comparative run, where dry ball-milling, followed by solvent extraction with diethyl ether, was used. Runs 4-7 were conducted using wet ball milling (i.e., ball milling of the reactants in the presence of a solvent). The yields are shown in Table 1.

In each run, the reaction mixture was agitated at room temperature for 36 hours, using the method described in Example 1, and then filtered through a medium glass frit. Evaporation of ether in vacuum, and heating of the resulting solid to 235° C., produced a white solid. The yields are shown in Table 1. From Table 1, it can be seen that under wet ball milling, the yields are increased significantly over dry ball milling and magnetic stirring.

TABLE 1

| Run | Synthesis | | | | | Analysis | | |
|---|---|---|---|---|---|---|---|---|
| | Agitation method | $MgCl_2$, grams | $NaBH_4$, grams | Wt. ratio of $MgCl_2$ to $NaBH_4$ | $Et_2O$, mL | Yield, % | Mg, wt. % | B, wt. % | Wt. ratio B:Mg |
| 1 (comparative) | Magnetic stirring | 3.0 | 3.6 | 3.0 | 250 | 0 | — | — | — |
| 2 (comparative) | Dispersing | 5.0 | 6.0 | 3.0 | 250 | 2.3 | — | — | — |
| 3 (comparative) | Dry ball milling | 11.4 | 11.0 | 2.4 | — | 1.2 | 41.6 | 33.1 | 1.79 |
| 4 | Wet ball milling | 3.0 | 2.4 | 2.0 | 120 | 70.5 | 47.1 | 32.9 | 1.57 |
| 5 | Wet ball milling | 20.1 | 24.2 | 3.0 | 350 | 40.4 | 49.5 | 36.4 | 1.66 |
| 6 | Wet ball milling | 20.0 | 25.0 | 3.2 | 120 | 75.7 | 43.6 | 33.9 | 1.75 |
| 7 | Wet ball milling | 30.0 | 36.0 | 3.0 | 350 | 66.2 | 43.7 | 34.2 | 1.76 |

As can be seen from the Table 1, the atomic ratio of boron to magnesium in all samples prepared by wet ball milling (Runs 4-7) of magnesium chloride with an excess of sodium borohydride is less than 2, due to the loss of some boron in the form of volatile compounds during the sample preparation. All samples display the same IR spectrum. The X-ray diffraction patterns shown in FIG. 2 do not change from synthesis to synthesis, or after additional thermal or mechanical treatments. This indicates the presence of a single phase that does not change upon thermal or mechanical treatments.

The material was further characterized by using high-resolution x-ray diffraction (wavelength 0.69127 Å) at the National Synchrotron Light Source at the Brookhaven National Laboratory. The diffraction pattern can be indexed by an orthorhombic unit cell with space group Fddd and the following dimensions: a=37.072(1) Å, b=18.6476(6) Å, c=0.9123(3) Å (Z=64) and cell volume, V=7543.71 Å³. FIG.

Figure 3:
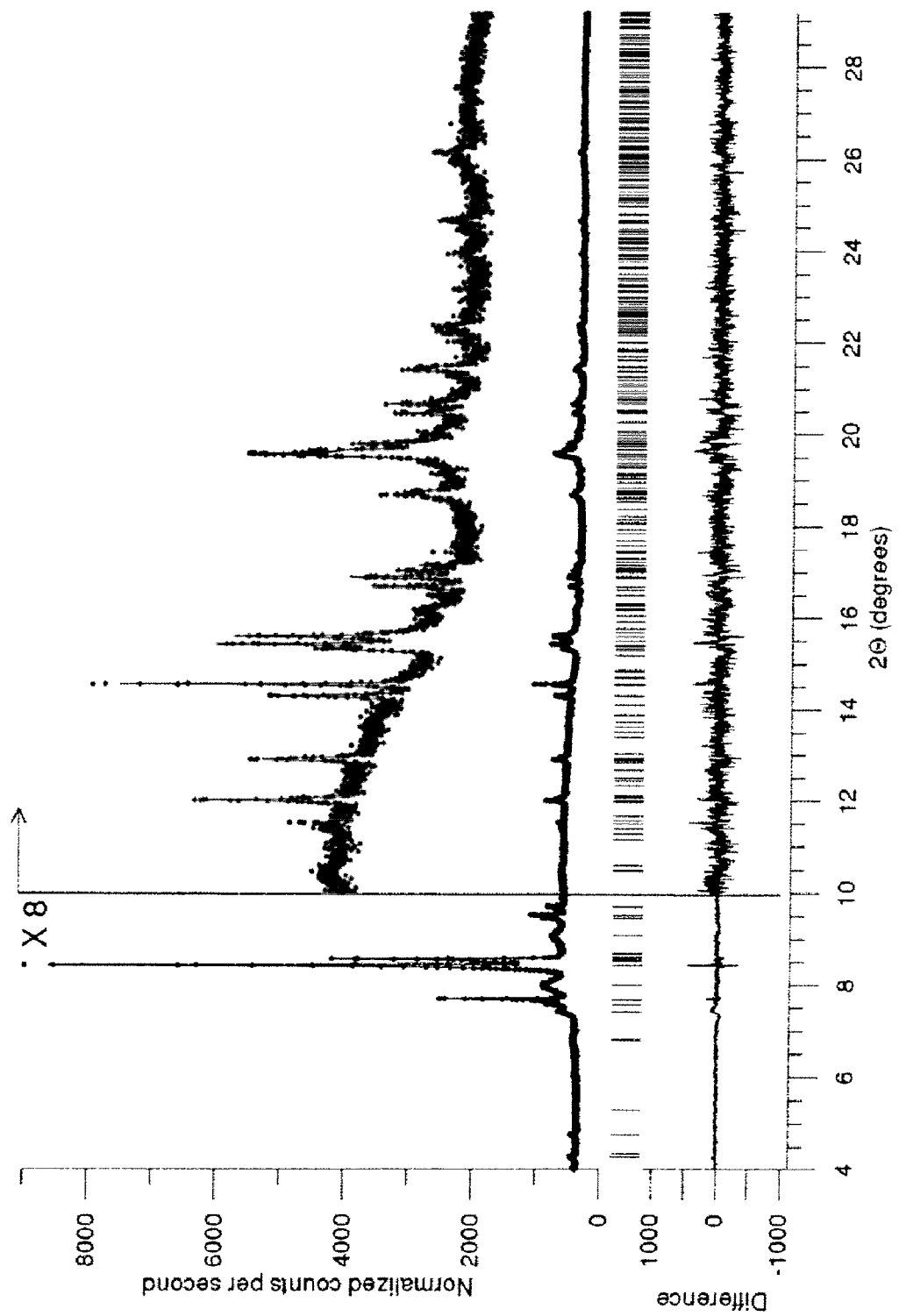
FIG. 3 is a high-resolution synchrotron powder diffraction pattern for an orthorhombic phase of magnesium borohydride.

3 displays the powder diffraction pattern for an orthorhombic phase of magnesium borohydride. The figure shows diffraction data (dots); the Rietveld fit (line); and the allowed Bragg reflections (tick marks) for the Mg(BH$_4$)$_2$ orthorhombic phase. The lower trace is the difference, (I$_{meas}$−I$_{calc}$), on the same scale. The crystal phase material depicted in FIG. 3 is thought to be novel, and very effective for storing and releasing hydrogen.

Figure 4:
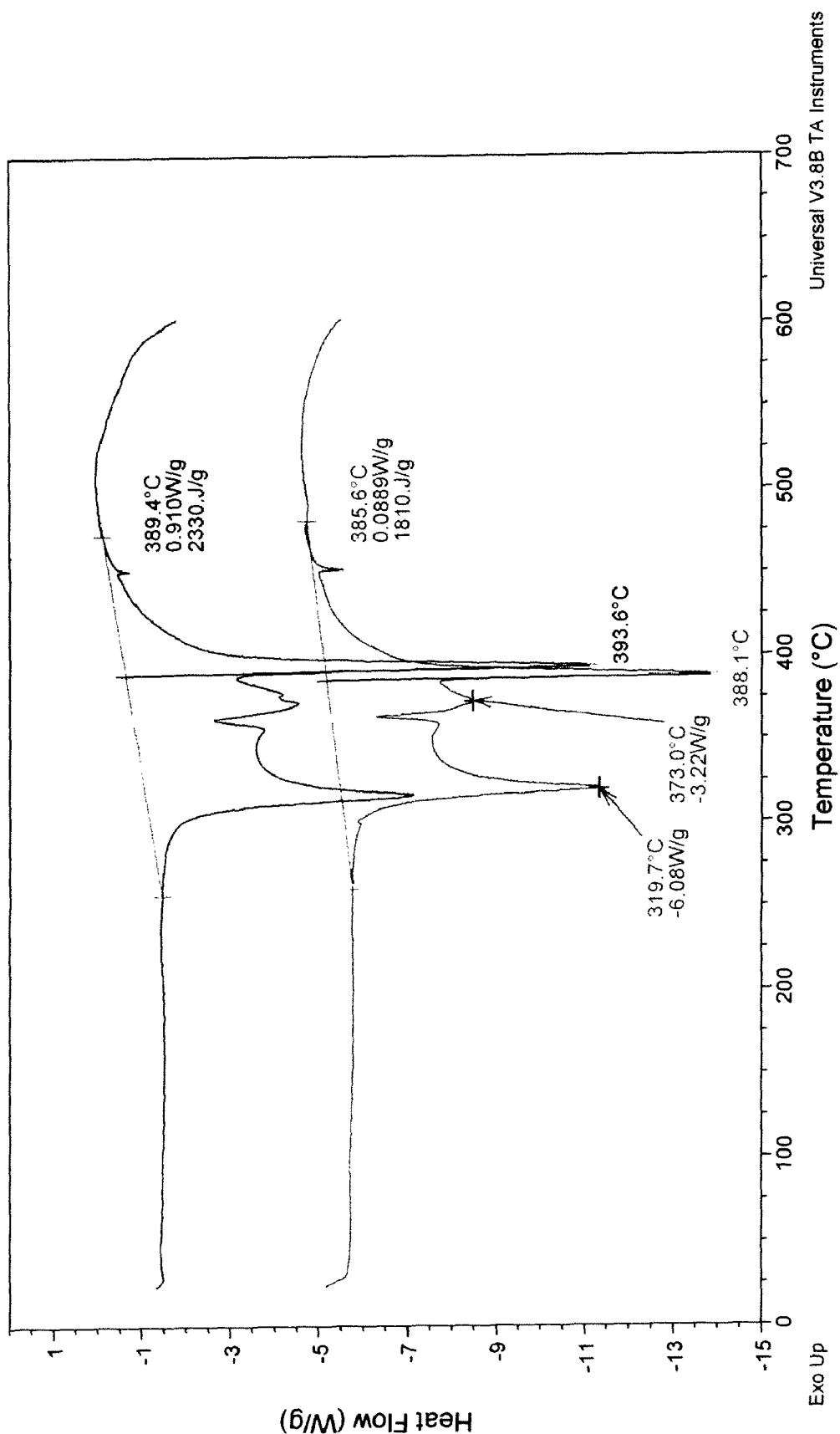
FIG. 4 is a graphical representation showing a differential calorimetry scan for magnesium borohydride.

FIG. 4 depicts two DSC curves obtained from thermal experiments performed on different samples of the composition, using differential scanning calorimetry at a heating rate of 10° C./minute. Both runs reflect similar thermal behavior, indicating that a consistent composition is produced.

It should again be emphasized that the grinding of the reactants during wet ball milling produces significantly higher yields than similar processes where grinding is not used. In addition, the reaction can proceed much more rapidly than processes where grinding is not used.

While the invention has been described with reference to exemplary embodiments, it will be understood by those skilled in the art that various changes may be made; and equivalents may be substituted for elements thereof, without departing from the scope of the invention. In addition, many modifications may be made to adapt a particular situation or material to the teachings of the invention, without departing from the essential scope thereof. Therefore, it is intended that the invention not be limited to the particular embodiment disclosed as the best mode contemplated for carrying out this invention.

What is claimed is:

1. A method for preparing magnesium borohydride, comprising the following steps:
    reacting a metal borohydride with a metal salt composition in a solvent to form a reaction mixture, wherein the metal salt composition comprises at least one magnesium salt; and both the metal borohydride and the metal salt composition are insoluble in the solvent;
    grinding the reaction mixture to produce a composition that comprises magnesium borohydride;
    removing the solvent from the composition that comprises magnesium borohydride; and
    heating the composition that comprises magnesium borohydride to a temperature of from about 180° C. to about 250° C.

2. The method of claim 1, further comprising separating the composition that comprises magnesium borohydride from insoluble reactants and reaction products.

3. The method of claim 1, wherein the grinding is conducted using ball milling, milling in a Wiley mill, hammer milling, rod milling, semi autogenous milling, autogenous milling, pebble milling, milling using high pressure grinding rolls, milling in a Buhrstone mill, or a combination comprising at least one of the foregoing grinding operations.

4. The method of claim 3 wherein the ball milling is carried out in a rolling ball mill or in a planetary ball mill.

5. The method of claim 1, wherein removal of the solvent is carried out in a vacuum.

6. The method of claim 1, wherein the metal borohydride is selected from the group consisting of sodium borohydride, potassium borohydride, calcium borohydride, strontium borohydride, and combinations comprising at least one of the foregoing metal borohydrides.

7. The method of claim 1, wherein the magnesium salt is selected from the group consisting of chloride salts, sulfate salts, phosphates, triflates, and combinations thereof.

8. The method of claim 1, wherein the magnesium salt comprises at least two metals, one of which is magnesium.

9. The method of claim 8, wherein the at least two metals includes lithium.

10. The method of claim 1, wherein the metal salt composition comprises magnesium chloride.

11. The method of claim 1, wherein the molar ratio of the borohydride (BH$_4$) group in the metal borohydride to the magnesium salt in the metal salt composition is about 2:1 to about 6:1.

12. The method of claim 11, wherein the molar ratio of the borohydride (BH$_4$) group in the metal borohydride to the magnesium salt in the metal salt composition is about 2:1 to about 3:1.

13. The method of claim 1, wherein a molar ratio of the solvent to the sum of the metal borohydride and the metal salt composition is about 50:1 to about 100:1.

14. The method of claim 1, wherein the solvent comprises an alkyl ether.

15. The method of claim 14, wherein the alkyl ether is selected from the group consisting of methyl ether, ethyl ether, propyl ether, and combinations comprising at least one of the foregoing alkyl ethers.

16. The method of claim 1, wherein the solvent comprises an alkyl amine.

17. The method of claim 1, wherein removing the solvent is carried out by a technique which comprises evaporation in vacuum.

* * * * *